(12) United States Patent
Chen et al.

(10) Patent No.: US 12,007,612 B2
(45) Date of Patent: Jun. 11, 2024

(54) SILICON PHOTONICS OPTICAL TRANSCEIVER DEVICE

(71) Applicant: WAVESPLITTER TECHNOLOGIES, INC., New Taipei (TW)

(72) Inventors: Ming-Ju Chen, Taitung County (TW);
Shih-Jhih Yang, Taichung (TW);
Hua-Hsin Su, Taoyuan (TW);
Wan-Pao Peng, Hsinchu (TW);
Wen-Hsien Lee, Kaohsiung (TW);
Peng-Kai Hsu, Taoyuan (TW);
Chung-Ho Wang, Taoyuan (TW)

(73) Assignee: WAVESPLITTER TECHNOLOGIES, INC., New Taipei (TW)

( * ) Notice: Subject to any disclaimer, the term of this patent is extended or adjusted under 35 U.S.C. 154(b) by 206 days.

(21) Appl. No.: 17/860,586

(22) Filed: Jul. 8, 2022

(65) Prior Publication Data

US 2023/0161122 A1   May 25, 2023

(30) Foreign Application Priority Data

Nov. 22, 2021   (TW) .................. 110143331

(51) Int. Cl.
*G02B 6/42* (2006.01)

(52) U.S. Cl.
CPC ......... *G02B 6/4269* (2013.01); *G02B 6/4272* (2013.01)

(58) Field of Classification Search
CPC ... G02B 6/4269; G02B 6/2472; G02B 6/4268
See application file for complete search history.

(56) References Cited

U.S. PATENT DOCUMENTS

| | | | |
|---|---|---|---|
| 9,918,377 B1* | 3/2018 | Shen | H05K 3/061 |
| 11,314,025 B2* | 4/2022 | Matsui | G02B 6/4246 |
| 2015/0104177 A1* | 4/2015 | Kato | H04B 10/40 |
| | | | 398/79 |

* cited by examiner

*Primary Examiner* — Sung H Pak
(74) *Attorney, Agent, or Firm* — GREENBERG TRAURIG, LLP (57) ABSTRACT

A silicon photonics optical transceiver device includes a silicon photonics optical module and a heat conducting housing that accommodates the silicon photonic optical module therein. The heat conducting housing has an inner surface formed with a first heat dissipation portion that wraps around and is in contact with transmitter optical sub-assemblies of the silicon photonics optical module to realize thermal conduction, and a second heat dissipation portion that is in contact with a digital signal processor of the silicon photonics optical module to realize thermal conduction.

5 Claims, 6 Drawing Sheets

FIG.7

SILICON PHOTONICS OPTICAL TRANSCEIVER DEVICE

CROSS-REFERENCE TO RELATED APPLICATION

This application claims priority of Taiwanese Invention Patent Application No. 110143331, filed on Nov. 22, 2021, the contents of which are incorporated herein by reference in its entirety.

FIELD

The disclosure relates to an optical transceiver device, and more particularly to a silicon photonics optical transceiver device.

BACKGROUND

Figure 1:
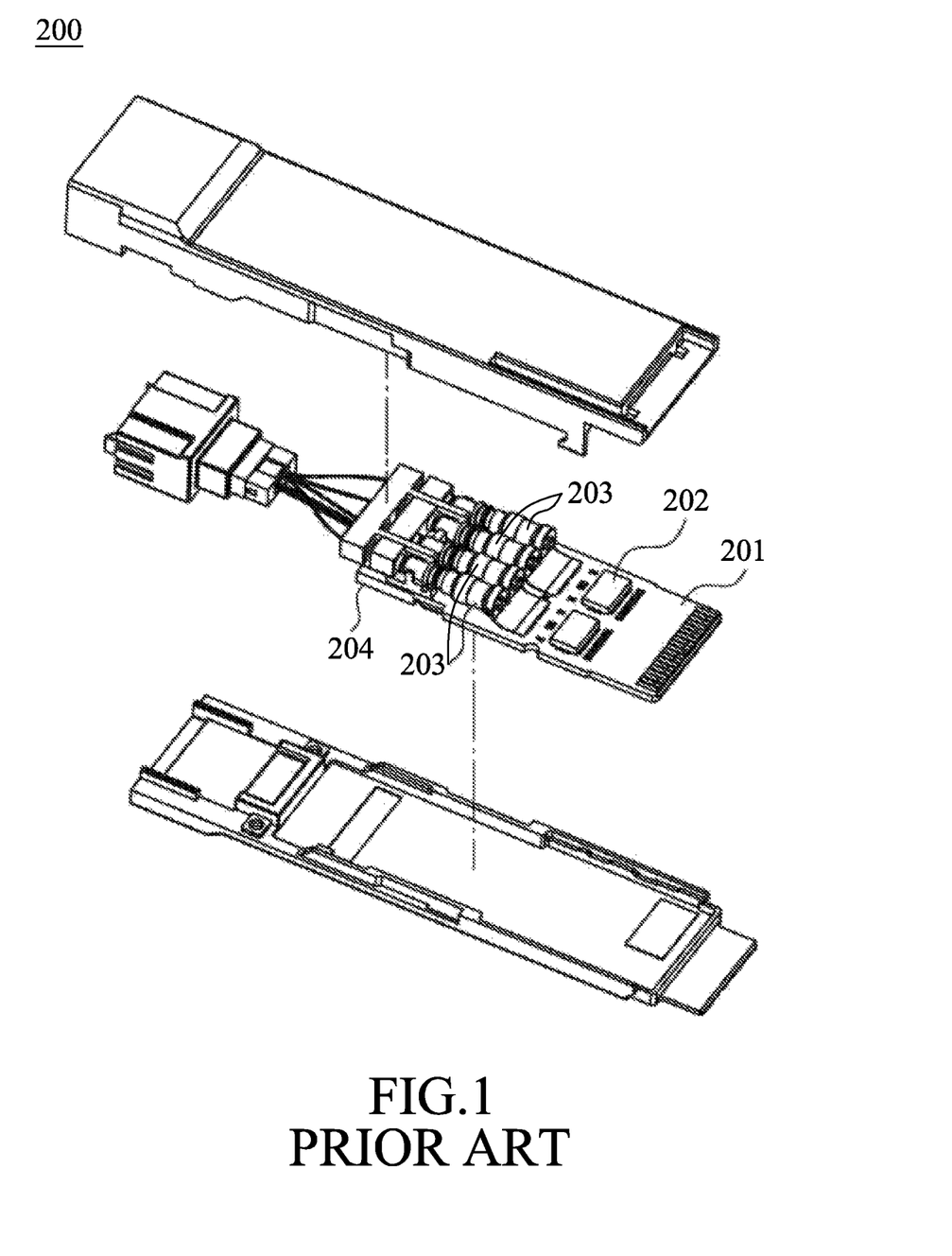
FIG. 1 is an exploded perspective view illustrating a conventional optical transceiver device.

Referring to FIG. 1, U.S. Patent Application Publication No. 2017/0059796 A1 discloses a conventional optical transceiver device 200 that is operable to convert electric signals into optical signals, to convert optical signals into electric signals, and to transmit optical signals and electrical signals. The conventional optical transceiver device 200 includes a processor 202 and multiple hermetic optical transmitter components 203 that are all mounted to a first surface of a substrate 201, and an optical receiver component 204 that is mounted to a second surface of the substrate 201. The optical transmitter components 203 and the optical receiver component 204 are electrically connected to the processor 202. The optical transmitter components 203 have hermeticity satisfying an airtightness requirement for industrial transmitter optical sub-assemblies (TOSAs), and are closely arranged side by side on the substrate 201.

During operation of the light emitter (e.g., a photoelectric chip; not shown) of each optical transmitter component 203, an input current cannot be fully converted into photoelectrons, and part of the input current will become energy loss in the form of heat. However, installation of cooling components for heat dissipation is hardly possible, especially for a miniaturized package, since the optical transmitter components 203 in the conventional optical transceiver device 200 are closely arranged side by side. Further, more heat may be generated when the processor 202 utilizes relatively complex 4-level pulse amplitude modulation (PAM4) to perform signal modulation at higher optical communication rates, such as 400 Gbps. If a large amount of heat continues to accumulate in the conventional optical transceiver device 200 and cannot be removed in time, there may be many adverse impacts on the performance of the conventional optical transceiver device 200. For example, the service life of components may be reduced, the performance may be deteriorated, materials may be aged or deformed. In the worst case, the components may be damaged or malfunction.

SUMMARY

Therefore, an object of the disclosure is to provide a silicon photonics optical transceiver that is adapted for high-speed optical fiber communication and that has good heat dissipation capability.

According to the disclosure, the silicon photonics optical transceiver device includes a silicon photonics optical module and a heat conducting housing. The silicon photonics optical module includes a substrate, a plurality of transmitter optical sub-assemblies (TOSAs), a digital signal processor and a silicon optical sub-assembly (SOSA). The substrate has an installation surface, is formed with a plurality of conductive traces, extending in an extending direction, and has a first end and a second end that are opposite to each other in the extending direction. The TOSAs are disposed on the first end of the substrate and extend away from the substrate in the extending direction. Each of the TOSAs is electrically connected to a corresponding part of the conductive traces, and has an optical port. The digital signal processor is mounted to the installation surface of the substrate and is spaced apart from the TOSAs. The SOSA is mounted to the installation surface of the substrate, and includes a photonic integrated circuit, a laser diode driver, a transimpedance amplifier, a polarization-maintaining optical fiber (PMF) component and a transmission optical fiber component. The photonic integrated circuit is fixedly mounted to the installation surface of the substrate, includes at least a beam splitter, a modulator and a photodiode, and has a first optical port segment and a second optical port segment, each having a plurality of optical ports. The laser diode driver and the transimpedance amplifier are electrically connected to and integrated with the photonic integrated circuit. Each of the laser diode driver and the transimpedance amplifier is electrically connected to the digital signal processor through a corresponding part of the conductive traces. The PMF component includes a first optical coupler seat which is coupled to the first optical port segment of the photonic integrated circuit, a plurality of connectors which are respectively coupled to the optical ports of the TOSAs, and a plurality of PMFs each of which is coupled between the first optical coupler seat and a respective one of the connectors. Each of the PMFs has an end portion optically coupled to a corresponding one of the optical ports of the first optical port segment of the photonic integrated circuit through the first optical coupler seat. The transmission optical fiber component includes a second optical coupler seat which is coupled to the second optical port segment of the photonic integrated circuit, an optical fiber connector, and a plurality of optical-fiber cables which are coupled between the second optical coupler seat and the optical fiber connector. Each of the optical-fiber cables includes a plurality of optical fibers, each having an end portion optically coupled to a corresponding one of the optical ports of the second optical port segment of the photonic integrated circuit through the second optical coupler seat. The heat conducting housing is formed with an inner accommodating space, a first opening, a second opening opposite to the first opening, and an inner surface defining the inner accommodating space. The inner accommodating space is for fittingly and firmly accommodating the silicon photonics optical module therein. The first opening is in spatial communication with the inner accommodating space for exposing the optical fiber connector. The inner surface has a first heat dissipation portion and a second heat dissipation portion. The first heat dissipation portion wraps around and is in contact with the TOSAs to realize thermal conduction, and the second heat dissipation portion is in contact with a surface of the digital signal processor, so as to transfer heat generated during operation of the TOSAs and the digital signal processor outside of the heat conducting housing.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
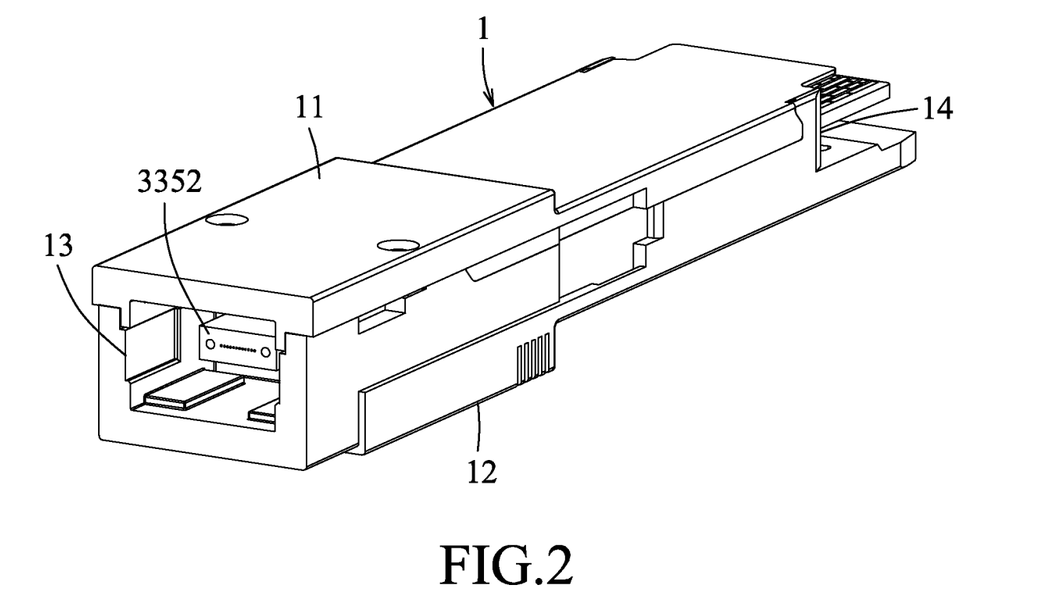
FIG. 2 is a perspective view illustrating an embodiment of a silicon photonics optical transceiver device according to the disclosure.
Figure 3:
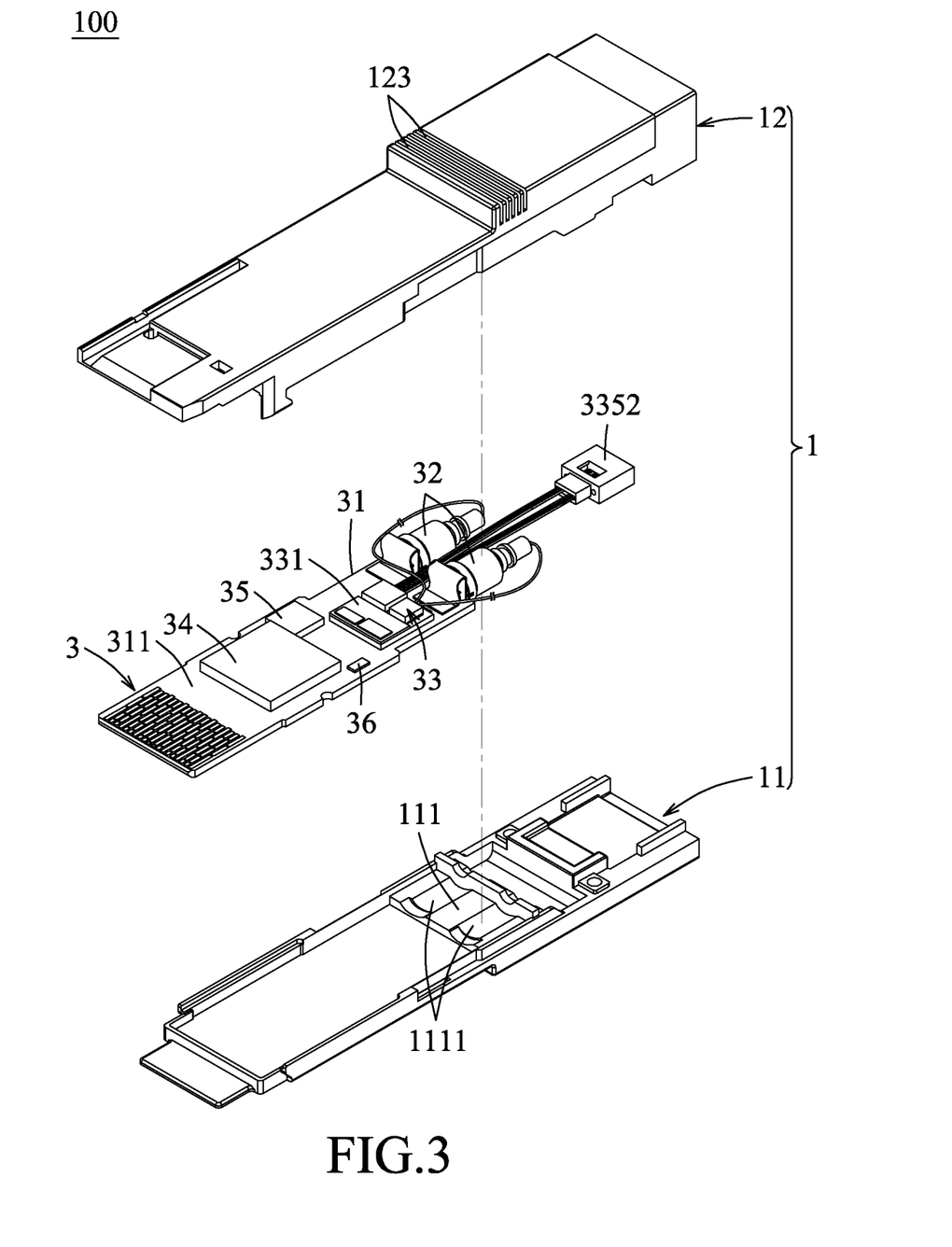
FIG. 3 is an exploded perspective view illustrating the embodiment.
Figure 4:
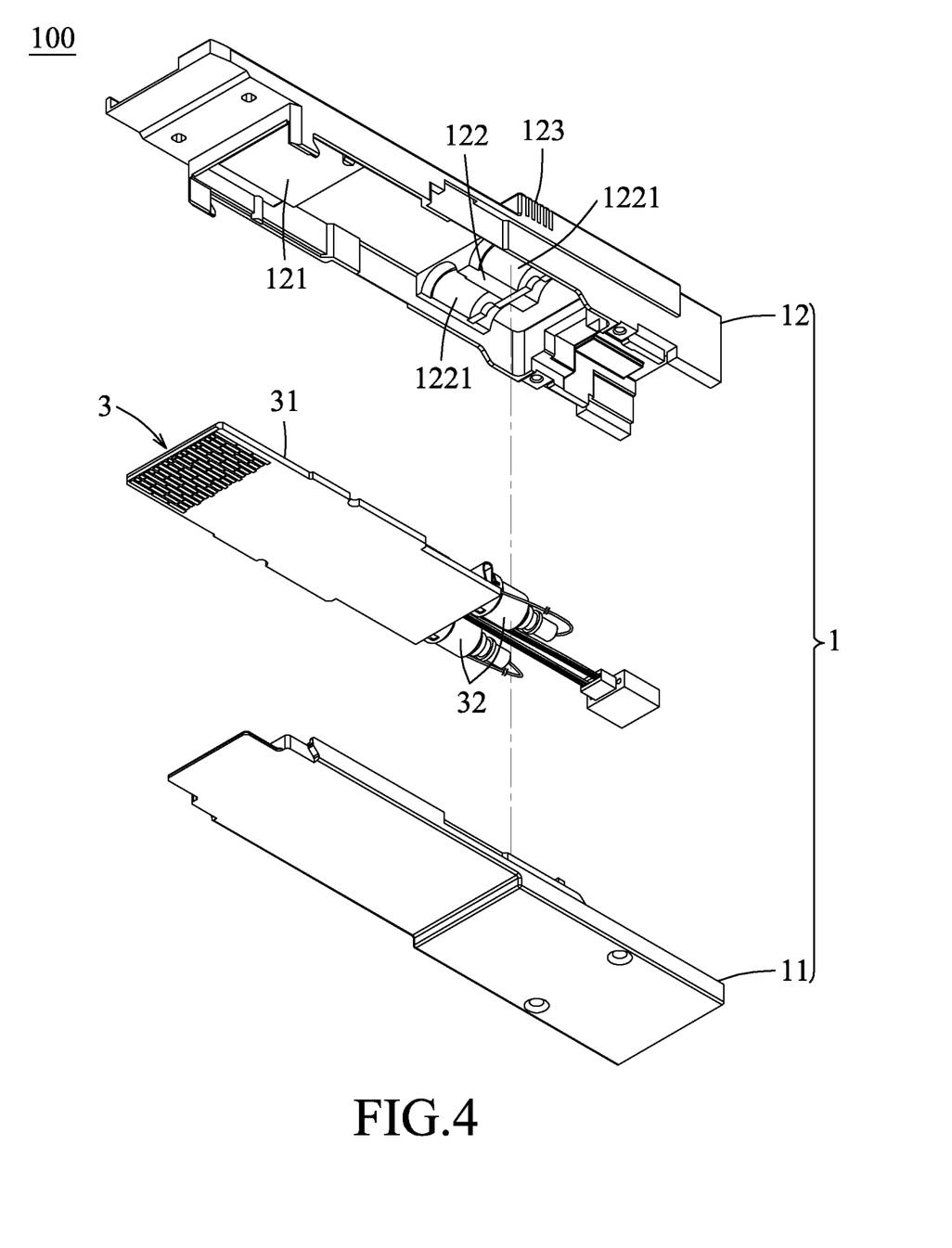
FIG. 4 is another exploded perspective view illustrating the embodiment.

Referring to FIGS. 2 to 4, an embodiment of a silicon photonics optical transceiver device 100 is adapted for receiving optical signals provided by an external optical transmitter (not shown), and/or for transmitting optical signals to an external optical receiver (not shown). The silicon photonics optical transceiver device 100 includes a silicon photonics optical module 3 and a heat conducting housing 1.

In this embodiment, the silicon photonics optical module 3 includes a substrate 31, multiple (not limited to two) transmitter optical sub-assemblies (TOSAs) 32, a silicon optical sub-assembly (SOSA) 33, a digital signal processor (DSP) 34, a microcontroller (MC) 35 and a driver controller 36, but this disclosure is not limited in this respect.

The substrate 31 is, for example, a printed circuit board (PCB), has a first end and a second end that are opposite to each other in a direction (referred to as extending direction hereinafter) that the substrate 31 extends in, and an installation surface 311, and is formed with a plurality of conductive traces. In some embodiments, the second end of the substrate 31 is a connecting end formed with gold fingers.

Figure 6:
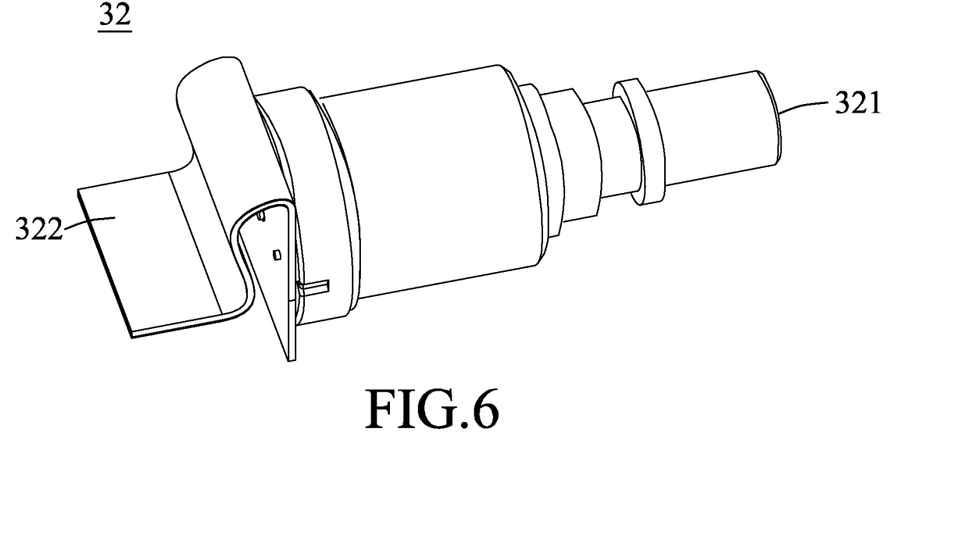
FIG. 6 is a perspective view illustrating a transmitter optical sub-assembly of the embodiment.

Referring to FIGS. 3 and 6, the TOSAs 32 are disposed at the first end of the substrate 31 and extend away from the substrate 31 in the extending direction. Each of the TOSAs 32 may have, for example, a high-power laser diode built therein and an optical port 321, and is configured to generate a to-be-transmitted optical signal based on a driving signal. In this embodiment, each of the TOSAs 32 includes a flexible printed circuit (FPC) 322 that is soldered onto the installation surface 311 of the substrate 31 for electric connection to a corresponding part of the conductive traces, so as to receive, through the corresponding part of the conductive traces and the FPC 322, the driving signal from the substrate 31.

The DSP 34 is disposed on the installation surface 311 of the substrate 31 and is spaced far apart from the TOSAs 32 to minimize potential adverse effects arising from heat generated by the TOSAs 32. In some embodiments, the DSP 34 is spaced apart from the TOSAs 32 by a distance that is greater than, for example but not limited to, 20 mm.

Figure 5:
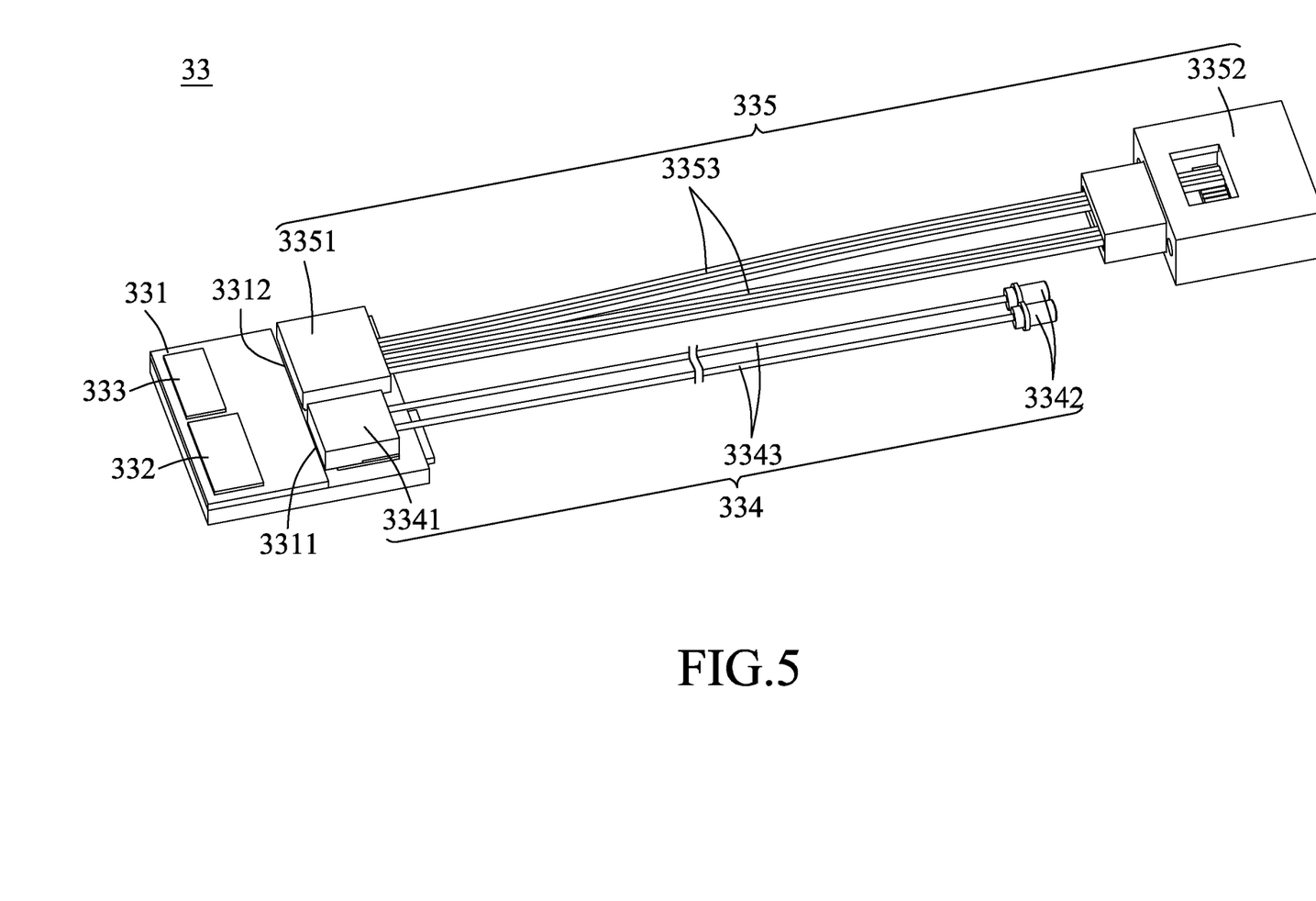
FIG. 5 is a perspective view illustrating a silicon optical sub-assembly of the embodiment.

Referring to FIGS. 3 and 5, the SOSA 33 is mounted to the installation surface 311 of the substrate 31, and includes, for example, a photonic integrated circuit (PIC) 331, a laser diode driver (LDD) 332, a transimpedance amplifier (TIA) 333, a polarization-maintaining optical fiber (PMF) component 334, and a transmission optical fiber component 335.

Figure 7:
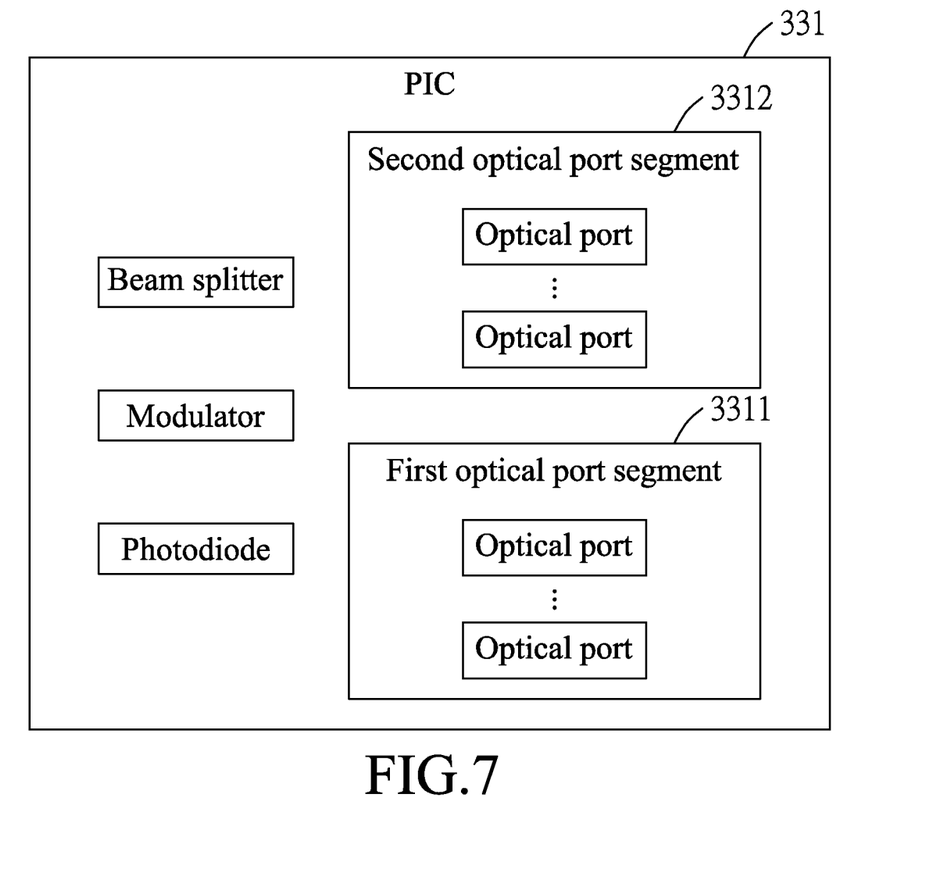
FIG. 7 is a block diagram illustrating a photonic integrated circuit of the embodiment.

Further referring to FIG. 7, the PIC 331 is produced using a silicon photonics manufacturing process, includes, for example, a beam splitter, a modulator and a photodiode, and has a first optical port segment 3311 and a second optical port segment 3312, each having a plurality of optical ports. In this embodiment, the PIC 331 is electrically connected to a corresponding part of the conductive traces of the substrate 31 using, for example, wire bonding, and is electrically connected to the DSP 334 and the FPCs 322 of the TOSAs 32 through the corresponding part of the conductive traces. In this embodiment, a strengthening substrate may be added to a bottom of the PIC 331, to be fixed onto the installation surface 311 of the substrate 31 through thermal glue, so as to enhance structural strength of the assembled SOSA 33.

In this embodiment, the LDD 332 and the TIA 333 are integrated/combined with the PIC 331, and are electrically connected to the PIC 331. As an example, the LDD 332 and the TIA 333 may be stacked on and electrically connected to the PIC 331 by flip chip, so the LDD 332 and the TIA 333 are electrically connected to the DSP 34 through the wire bonded between the PIC 331 and the part of the conductive trances that corresponds to the PIC 331, but this disclosure is not limited in this respect. In other embodiments, it may be possible that the LDD 332 and the TIA 333 are not stacked on the PIC 311, and are instead mounted onto the installation surface 311 through wire bonding. In such a configuration, the LDD 332 would be electrically connected to the DSP 34 and the PIC 331 through corresponding conductive traces, and the TIA 333 may be electrically connected to the photodiode of the PIC 331 through corresponding conductive traces.

The driver controller 36 is mounted to the installation surface 311 of the substrate 31, is electrically connected to the PIC 331 through a corresponding part of the conductive traces, and is operable to generate a direct current (DC) driver signal that is related to the TOSAs 32, wherein the DC driver signal may be a voltage signal or a current signal. The LDD 332 is operable to generate a radio frequency (RF) signal that is related to the TOSAs 32 and to modulation performed by the modulator of the PIC 331. With respect to each of the TOSAs 32, the PIC 331 generates and outputs the driving signal to the TOSA 32 based on the DC driver signal and the RF signal that are received from the driver controller 36 and the LDD 332, respectively. In some embodiments, the driver controller 36 and the LDD 332 may be integrated into a single chip.

Referring to FIGS. 3, 5 and 6, the PMF component 334 includes a first optical coupler seat 3341, multiple connectors 3342, and multiple PMFs 3343. The first optical coupler seat 3341 is coupled to the first optical port segment 3311 of the PIC 331. The connectors 3342 are respectively coupled to the optical ports 321 of the TOSAs 32. Each of the PMFs 3343 is coupled between the first optical coupler seat 3341 and a respective one of the connectors 3342, and has an end portion optically coupled to a corresponding one of the optical ports of the first optical port segment 3311 of the PIC 331 through the first optical coupler seat 3341. In this embodiment, the first optical coupler seat 3341 is glued to the first optical port segment 3311 of the PIC 331 in order to ensure reliability in terms of transmission of optical signals.

The transmission optical fiber component 335 includes a second optical coupler seat 3351, an optical fiber connector 3352, and multiple optical-fiber cables 3353. The second optical coupler seat 3351 is coupled to the second optical port segment 3312 of the PIC 331. The optical fiber connector 3352 is configured for connection with an external fiber connector (not shown). The optical-fiber cables 3353 are coupled between the second optical coupler seat 3351 and the optical fiber connector 3352. Each of the optical-fiber cables 3353 includes a plurality of optical fibers, each having an end portion optically coupled to a corresponding one of the optical ports of the second optical port segment 3312 of the PIC 331 through the second optical coupler seat 3351. In this embodiment, the second optical coupler seat 3351 is glued to the second optical port segment 3312 of the PIC 331.

The microcontroller 35 is mounted to the installation surface 311 of the substrate 31, and is configured to provide firmware control related to the silicon photonics optical module 3.

Referring to FIGS. 2 through 4, the heat conducting housing 1 (e.g., made of, for example but not limited to, zinc alloy, copper, tungsten-copper alloy, aluminum, etc.) is formed with an inner accommodating space for fittingly and firmly accommodating the silicon photonics optical module 3 therein, and has a first opening 13 and a second opening 14 that are opposite to each other in the extending direction. The first opening 13 is in spatial communication with the inner accommodating space for exposing the optical fiber connector 3352, and the second opening 14 is in spatial communication with the inner accommodating space for exposing the second end (i.e., the connecting end) of the substrate 31. The heat conducting housing 1 has an inner surface that defines the inner accommodating space, and that has a first heat dissipation portion and a second heat dissipation portion, wherein the first heat dissipation portion is configured to be in contact with the TOSAs 32 to realize thermal conduction, and the second heat dissipation portion is configured to be in contact with the DSP 34 to realize thermal conduction. In this embodiment, the heat conducting housing 1 includes a seat body 11 that is configured for holding the silicon photonics optical module 3, and a cover body 12 that covers the installation surface 311 of the substrate 31. The cover body 12 has an inner surface (which is a part of the inner surface of the heat conducting housing 1) formed with a heat dissipation bump 121 and a first heat sink 122. The heat dissipation bump 121 serves as the second heat dissipation portion, corresponds in position to the DSP 34, and fittingly contacts a surface of the DSP 34. The first heat sink 122 corresponds in position to the TOSAs 32, and covers part of the TOSAs 32. In this embodiment, the first heat sink 122 has a plurality of first concave (arc-shaped and curved inward) surfaces 1221, each of which fittingly contacts a respective one of the TOSAs 32. The seat body 11 has an inner surface (which is the remaining part of the inner surface of the heat conducting housing 1) formed with a second heat sink 111 that corresponds in position to the TOSAs 32 and that covers part of the TOSAs 32. In this embodiment, the second heat sink 111 has a plurality of second concave surfaces 1111, each of which fittingly contacts a respective one of the TOSAs 32. As a result, each of the second concave surfaces 1111 of the second heat sink 111 cooperates with a corresponding one of the first concave surfaces 1221 of the first heat sink 122 to wrap around the respective one of the TOSAs 32, and the first heat sink 122 and the second heat sink 111 cooperatively constitute the first heat dissipation portion that wraps around and is in contact with the TOSAs 32 to realize thermal conduction. Therefore, the heat generated during operation of the TOSAs 32 and the DSP 34 may be transferred to the cover body 12 and the seat body 11 through the first and second heat dissipation portions, and is then released to the outside of the heat conducting housing 1. In this embodiment, an outer surface of the cover body 12 is formed with a plurality of cooling fins 123 (see FIG. 3) that correspond in position to the first heat sink 122, so as to release the heat to the environment more rapidly.

During operation, when the silicon photonics optical transceiver device 100 receives an external optical signal through the transmission optical fiber component 335, the photodiode of the PIC 331 would convert the optical signal into a current signal, and the TIA 333 would convert the current signal into a voltage signal, and transmit the voltage signal to the DSP 34 for subsequent processing. When the silicon photonics optical transceiver device 100 is used to output an optical signal, the DSP 34 outputs a control signal that is related to the optical signal to the LDD 332, and the LDD 332 generates an RF signal based on the control signal. Then, the PIC 331 provides a driving signal to each of the TOSAs 32 based on a DC driver signal received from the driver controller 36 and the RF signal received from the LDD 332, and the TOSAs 32 emit a two-way optical signal to the PIC 331 through the PMF component 334. After modulation and split-beam processing, the two-way optical signal is converted into, for example, a four-way optical signal that is subsequently transmitted outside of the silicon photonics optical transceiver device 100 through the transmission optical fiber component 335.

In summary, the embodiment of the silicon photonics optical transceiver device 100 according to this disclosure may have the following advantages:

1. The PIC 331 integrates the beam splitter, the modulator and the photodiode therein, and has the LDD 332 and the TIA 333 staked thereon, so an area of the substrate 31, which is a PCB in the embodiment, can be reduced, thereby favoring reduction of overall dimensions of the silicon photonics optical transceiver device 100. Furthermore, the use of the beam splitter may reduce a number of the TOSAs 32 to be used in the silicon photonics optical transceiver device 100.
2. The first heat dissipation portion can effectively transfer the heat generated by the TOSAs 32 outside of the heat conducting housing 1, so high-power laser diodes that do not need impedance matching can be used in the TOSAs 32, thereby avoiding electric reflection noises from poor impedance matching.
3. The first optical coupler seat 3341 and the second optical coupler seat 3351 are respectively coupled to the first and second optical port segments 3311, 3312 using glue, thereby promoting reliability in terms of transmission of optical signals.
4. The first and second heat dissipation portions are respectively in contact with the TOSAs 32 and the DSP 34 to realize thermal conduction, so the heat generated by the TOSAs and the DSP 34 can be effectively and rapidly transferred to the outside of the heat conducting housing 1 through the first and second heat dissipation portions and the cooling fins 123.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A silicon photonics optical transceiver device, comprising:
    a silicon photonics optical module that includes:
        a substrate having an installation surface, formed with a plurality of conductive traces, extending in an extending direction, and having a first end and a second end that are opposite to each other in the extending direction;
        a plurality of transmitter optical sub-assemblies (TOSAs) disposed on said first end of said substrate and extending away from said substrate in the extending direction, wherein each of said TOSAs is electrically connected to a corresponding part of the conductive traces, and has an optical port;
        a digital signal processor mounted to said installation surface of said substrate and spaced apart from said TOSAs; and
        a silicon optical sub-assembly (SOSA) mounted to said installation surface of said substrate;
    wherein said silicon optical sub-assembly includes:
        a photonic integrated circuit that is fixedly mounted to said installation surface of said substrate, that includes at least a beam splitter, a modulator and a photodiode, and that has a first optical port segment and a second optical port segment, each having a plurality of optical ports;
        a laser diode driver and a transimpedance amplifier that are electrically connected to and integrated with said photonic integrated circuit, each of said laser diode driver and said transimpedance amplifier being electrically connected to said digital signal processor through a corresponding part of said conductive traces;
        a polarization-maintaining optical fiber (PMF) component that includes a first optical coupler seat which is coupled to said first optical port segment of said photonic integrated circuit, a plurality of connectors which are respectively coupled to said optical ports of said TOSAs, and a plurality of PMFs each of which is coupled between said first optical coupler seat and a respective one of said connectors, wherein each of said PMFs has an end portion optically coupled to a corresponding one of said optical ports of said first optical port segment of said photonic integrated circuit through said first optical coupler seat; and
        a transmission optical fiber component that includes a second optical coupler seat which is coupled to said second optical port segment of said photonic integrated circuit, an optical fiber connector, and a plurality of optical-fiber cables which are coupled between said second optical coupler seat and said optical fiber connector, wherein each of said optical-fiber cables includes a plurality of optical fibers, each having an end portion optically coupled to a corresponding one of said optical ports of said second optical port segment of said photonic integrated circuit through said second optical coupler seat;
    said silicon photonics optical transceiver device further comprising a heat conducting housing that is formed with:
        an inner accommodating space for fittingly and firmly accommodating said silicon photonics optical module therein;
        a first opening in spatial communication with said inner accommodating space for exposing said optical fiber connector;
        a second opening opposite to said first opening; and
        an inner surface defining said inner accommodating space, and having a first heat dissipation portion and a second heat dissipation portion;
    wherein said first heat dissipation portion wraps around and is in contact with said TOSAs to realize thermal conduction, and said second heat dissipation portion is in contact with a surface of said digital signal processor, so as to transfer heat generated during operation of said TOSAs and said digital signal processor outside of said heat conducting housing.

2. The silicon photonics optical transceiver device of claim 1, wherein said first optical coupler seat and said second optical coupler seat of said PMF component are respectively glued to said first optical port segment and said second optical port segment.

3. The silicon photonics optical transceiver device of claim 1, wherein said photonic integrated circuit is fixed onto said installation surface of said substrate through thermal glue, and is electrically connected to the corresponding part of said conductive traces through wire bonding.

4. The silicon photonics optical transceiver device of claim 1, wherein said heat conducting housing includes a seat body that holds said silicon photonics optical module, and a cover body that covers said installation surface of said substrate,
    wherein said cover body has an inner surface formed with a heat dissipation bump that corresponds in position to said digital signal processor, and a first heat sink that corresponds in position to said TOSAs;
    wherein said heat dissipation bump serves as said second heat dissipation portion and fittingly contacts said surface of said digital signal processor;
    wherein said first heat sink has a plurality of first concave surfaces, each of which fittingly contacts a respective one of said TOSAs;
    wherein said seat body has an inner surface formed with a second heat sink corresponding in position to said TOSAs;
    wherein said second heat sink has a plurality of second concave surfaces, each of which fittingly contacts a respective one of said TOSAs;
    wherein each of said second concave surfaces of said second heat sink cooperates with a corresponding one of said first concave surfaces of said first heat sink to wrap around the respective one of said TOSAs; and
    wherein said first heat sink and said second heat sink cooperatively constitute said first heat dissipation portion.

5. The silicon photonics optical transceiver device of claim 4, wherein said cover body has an outer surface formed with a plurality of cooling fins that correspond in position to said first heat sink.

* * * * *